US012647069B2

(12) United States Patent
Xiao et al.

(10) Patent No.: US 12,647,069 B2
(45) Date of Patent: Jun. 2, 2026

(54) METHOD AND SYSTEM FOR EVALUATING CLEANING DEMAND OF PHOTOVOLTAIC PANEL BASED ON ENVIRONMENTAL METEOROLOGICAL INFLUENCE

(71) Applicant: BEIJING FLWIND TECHNOLOGY DEVELOPMENT CO., LTD, Beijing (CN)

(72) Inventors: Yang Xiao, Beijing (CN); Yuanqin Yang, Beijing (CN)

(73) Assignee: BEIJING FLWIND TECHNOLOGY DEVELOPMENT CO., LTD, Beijing (CN)

( * ) Notice: Subject to any disclaimer, the term of this patent is extended or adjusted under 35 U.S.C. 154(b) by 23 days.

(21) Appl. No.: 18/844,217

(22) PCT Filed: Nov. 9, 2023

(86) PCT No.: PCT/CN2023/130756
§ 371 (c)(1),
(2) Date: Sep. 5, 2024

(87) PCT Pub. No.: WO2024/125172
PCT Pub. Date: Jun. 20, 2024

(65) Prior Publication Data
US 2025/0175121 A1    May 29, 2025

(30) Foreign Application Priority Data
Dec. 13, 2022    (CN) .......................... 202211592120.6

(51) Int. Cl.
*H02S 40/10* (2014.01)
*H02S 50/00* (2014.01)
(Continued)

(52) U.S. Cl.
CPC .............. *H02S 40/10* (2014.12); *H02S 50/00* (2013.01); *H02S 50/10* (2014.12); *G06Q 10/04* (2013.01); *G06Q 10/20* (2013.01); *G06Q 50/06* (2013.01)

(58) Field of Classification Search
CPC .......... H02S 40/10; H02S 50/10; H02S 50/00; G06Q 10/04; G06Q 10/20; G06Q 50/06
See application file for complete search history.

(56) References Cited

U.S. PATENT DOCUMENTS

2018/0196901 A1    7/2018  McBrearty et al.

FOREIGN PATENT DOCUMENTS

CN    109242208  A    1/2019
CN    115099541  A    9/2022
CN    115641029  A    1/2023

OTHER PUBLICATIONS

English Machine Translation of CN115099541A (Year: 2022).*
International Search Report for corresponding International Patent Application No. PCT/CN2023/130756, mailed Jan. 30, 2024.

* cited by examiner

*Primary Examiner* — Kourtney R S Carlson
(74) *Attorney, Agent, or Firm* — GRUMBLES LAW PLLC; Brittany Haanan

(57) ABSTRACT

A method and system for evaluating cleaning demand of a photovoltaic panel based on environmental meteorological influence is provided. The method includes: determining a photovoltaic-panel generated power attenuation rate based on a photovoltaic-panel pollution environmental meteorological comprehensive index; determining a maximum surplus of a photovoltaic power station based on the attenuation rate, where a cleaning cycle corresponding to the maximum surplus is an optimal cleaning cycle; determining a cumulative amount of the comprehensive index in the optimal (Continued)

cleaning cycle as an optimal cumulative amount of the comprehensive index; calculating a standardized clean index of the photovoltaic panel based on the optimal cumulative amount of the comprehensive index; determining an influence index of meteorological elements on the photovoltaic panel in a predetermined time; and evaluating the cleaning cycle and determining an optimal cleaning time based on the influence index and the standardized clean index of the photovoltaic panel.

9 Claims, 3 Drawing Sheets

(51) Int. Cl.
    H02S 50/10     (2014.01)
    *G06Q 10/04*     (2023.01)
    *G06Q 10/20*     (2023.01)
    *G06Q 50/06*     (2024.01)

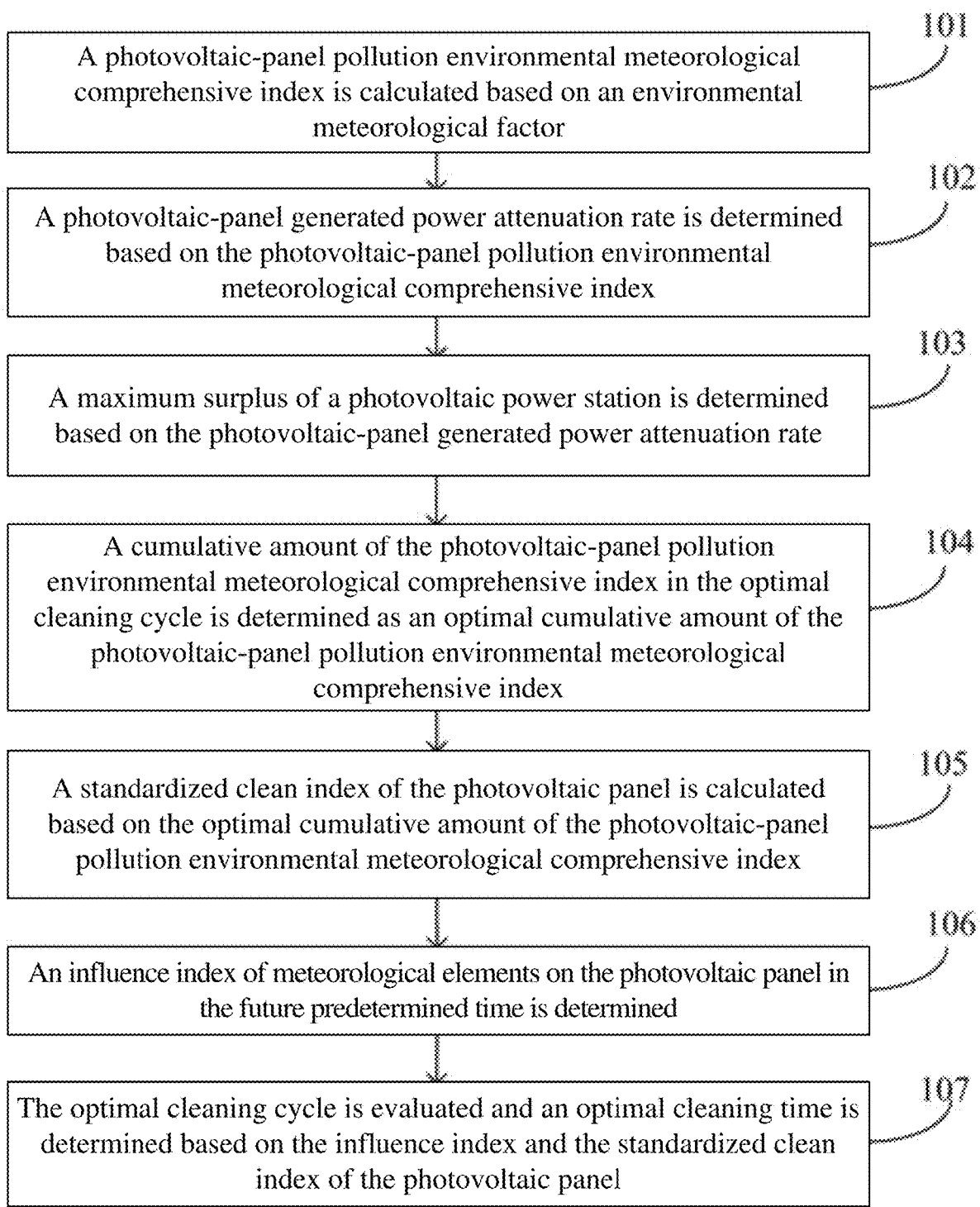

A photovoltaic-panel pollution environmental meteorological comprehensive index is calculated based on an environmental meteorological factor — 101

A photovoltaic-panel generated power attenuation rate is determined based on the photovoltaic-panel pollution environmental meteorological comprehensive index — 102

A maximum surplus of a photovoltaic power station is determined based on the photovoltaic-panel generated power attenuation rate — 103

A cumulative amount of the photovoltaic-panel pollution environmental meteorological comprehensive index in the optimal cleaning cycle is determined as an optimal cumulative amount of the photovoltaic-panel pollution environmental meteorological comprehensive index — 104

A standardized clean index of the photovoltaic panel is calculated based on the optimal cumulative amount of the photovoltaic-panel pollution environmental meteorological comprehensive index — 105

An influence index of meteorological elements on the photovoltaic panel in the future predetermined time is determined — 106

The optimal cleaning cycle is evaluated and an optimal cleaning time is determined based on the influence index and the standardized clean index of the photovoltaic panel — 107

FIG. 1

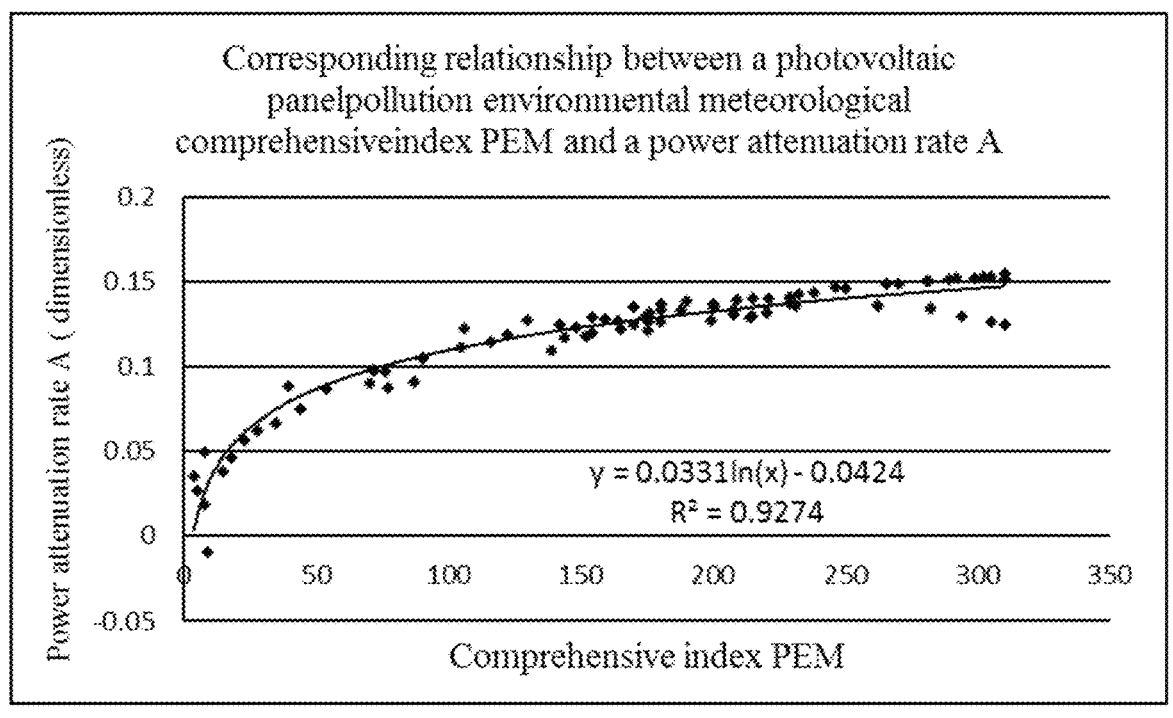
FIG. 2
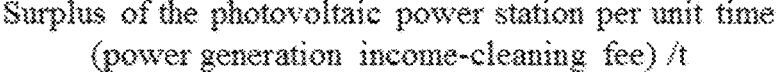
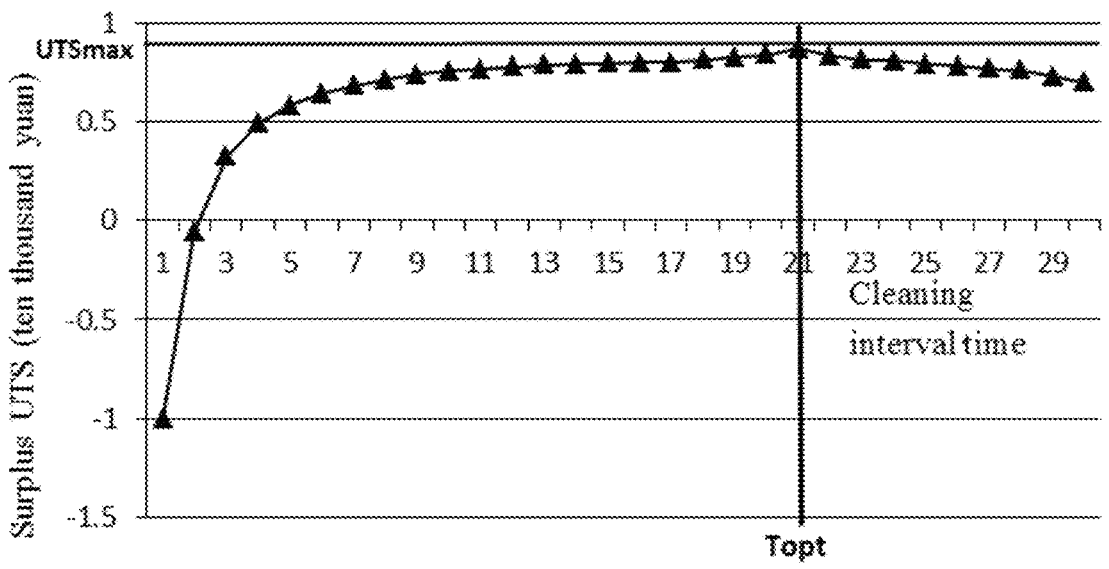
FIG. 3

A time series diagram of a standardized clean index CIPs of thephotovoltaic panel at Aksu, Xinjiang, China

METHOD AND SYSTEM FOR EVALUATING CLEANING DEMAND OF PHOTOVOLTAIC PANEL BASED ON ENVIRONMENTAL METEOROLOGICAL INFLUENCE

CROSS REFERENCE TO RELATED APPLICATION

This patent application is a continuation of International Application No. PCT/CN2023/130756, filed on Nov. 9, 2023, which claims the priority of the Chinese Patent Application No. 202211592120.6 filed with China National Intellectual Property Administration on Dec. 13, 2022 and entitled as "METHOD AND SYSTEM FOR EVALUATING CLEANING DEMAND OF PHOTOVOLTAIC PANEL BASED ON ENVIRONMENTAL METEOROLOGICAL INFLUENCE". Both of the aforementioned applications are incorporated by reference herein in their entireties as part of the present application.

TECHNICAL FIELD

The present disclosure relates to the technical field of the photovoltaic power stations, in particular to a method and a system for evaluating cleaning demand of a photovoltaic panel based on environmental meteorological influence.

BACKGROUND

The real operating power of a photovoltaic power station is directly related to the amount of solar radiation received on the surface of a photovoltaic panel. The "pollution" of the photovoltaic panel may lead to a decrease in generated power and thus a decrease in power generation income, and too frequent cleaning will increase the costs excessively. Therefore, a scientific cleaning strategy of the photovoltaic panel is the key to solve the problem. At present, because the degree of "pollution" of the photovoltaic panel and its influence on power generation reduction are difficult to objectively and quantitatively assess, most photovoltaic power stations still use a manual experience determination method or a regular cleaning method, which cannot meet the actual accurate cleaning demand of a photovoltaic power station panel.

SUMMARY

The objective of the present disclosure is to provide a method and a system for evaluating cleaning demand of a photovoltaic panel based on environmental meteorological influence to solve the problem that the photovoltaic power station still uses a manual experience determination method or a regular cleaning method, which cannot meet the actual accurate cleaning demand of a photovoltaic power station panel.

In order to achieve the above objective, the present disclosure provides the following scheme.

A method for evaluating cleaning demand of a photovoltaic panel based on environmental meteorological influence, which includes:

calculating a photovoltaic-panel pollution environmental meteorological comprehensive index based on an environmental meteorological factor, where the environmental meteorological factor includes an environmental pollution factor, a meteorological dynamic factor and a meteorological thermodynamic factor;

determining a photovoltaic-panel generated power attenuation rate based on the photovoltaic-panel pollution environmental meteorological comprehensive index;

determining a maximum surplus of a photovoltaic power station based on the photovoltaic-panel generated power attenuation rate, where a cleaning cycle corresponding to the maximum surplus is an optimal cleaning cycle;

determining a cumulative amount of the photovoltaic-panel pollution environmental meteorological comprehensive index in the optimal cleaning cycle as an optimal cumulative amount of the photovoltaic-panel pollution environmental meteorological comprehensive index;

calculating a standardized clean index of the photovoltaic panel based on the optimal cumulative amount of the photovoltaic-panel pollution environmental meteorological comprehensive index;

determining an influence index of meteorological elements on the photovoltaic panel in a future predetermined time; and evaluating the optimal cleaning cycle and determining an optimal cleaning time based on the influence index and the standardized clean index of the photovoltaic panel.

In some embodiments, the calculating a photovoltaic-panel pollution environmental meteorological comprehensive index based on an environmental meteorological factor specifically includes:

calculating a pollution index E of the environmental pollution factor on the photovoltaic panel through a formula $E=(1-1/PM)*PM$, where PM denotes a total concentration of particulate pollutants with various particle sizes for the environmental pollution factor;

calculating a pollution index $\gamma$ of the meteorological dynamic factor on the photovoltaic panel through a formula $\gamma=1-\exp(-\zeta^2/2)$, where $\zeta$ denotes a meteorological dynamic factor parameter;

calculating a pollution index $\beta$ of the meteorological thermodynamic factor on the photovoltaic panel through a formula $\beta=1-\exp(-\theta_e)$, where $\theta_e$ denotes a meteorological thermodynamic factor parameter; and calculating a photovoltaic-panel pollution environmental meteorological comprehensive index PEM through a formula $PEM=(\gamma+\beta)*E*\phi$, where $\phi$ denotes a comprehensive parameter of the photovoltaic panel.

In some embodiments, the determining a photovoltaic-panel generated power attenuation rate based on the photovoltaic-panel pollution environmental meteorological comprehensive index specifically includes:

determining a relationship model between photovoltaic-panel pollution environmental meteorological comprehensive index and the photovoltaic-panel generated power attenuation rate using a big data machine learning algorithm; and substituting the photovoltaic-panel pollution environmental meteorological comprehensive index into the relationship model to obtain the photovoltaic-panel generated power attenuation rate.

In some embodiments, the determining a maximum surplus of a photovoltaic power station based on the photovoltaic-panel generated power attenuation rate specifically includes:

calculating a total cleaning cost of the photovoltaic panel;

calculating a total power generation income of the photovoltaic power station based on the generated power attenuation rate; and calculating the maximum surplus of the photovoltaic power station based on the total cleaning cost of the photovoltaic panel and the total power generation income of the photovoltaic power station.

In some embodiments, the calculating a standardized clean index of the photovoltaic panel based on the optimal cumulative amount of the photovoltaic-panel pollution environmental meteorological comprehensive index specifically includes:

calculating a standardized clean index CIPs of the photovoltaic panel through a formula $CIPs=(CIP_{tn}-CIP_{t0})/(CIP_{opt}-CIP_{t0})*100$, where $CIP_{t0}$ is a clean index of the photovoltaic panel at a time t0, $CIPt_{tn}$ is a clean index of the photovoltaic panel at a time tn, and $CIP_{opt}$ is a clean index of the photovoltaic panel corresponding to the optimal cumulative amount of the photovoltaic panel pollution environmental meteorological comprehensive index.

In some embodiments, a formula of the influence index of meteorological elements on the photovoltaic panel in the future predetermined time is represented as follows:

$$MF_j = F(x_{ij}) = \begin{cases} 1 & \text{without influence} \\ 2 & \text{with influence} \end{cases},$$

where $MF_j$ denotes an influence index of future meteorological elements on the photovoltaic panel, $F(.)$ denotes a function about an influence factor, $x_{ij}$ denotes an influence factor of an i-th future meteorological element in the future predetermined time, and j denotes a future predetermined time.

In some embodiments, the evaluating the optimal cleaning cycle and determining an optimal cleaning time based on the influence index and the standardized clean index of the photovoltaic panel specifically includes:

when the standardized clean index of the photovoltaic panel is less than 100, no cleaning is performed;

when the standardized clean index of the photovoltaic panel is equal to 100, the current time is the optimal cleaning time; and considering superposition influence of the influence index, a cleaning strategy is as follows:

if the $MF_j$ is equal to 1, it is indicated that meteorological elements have no influence on the photovoltaic panel in the future predetermined time, and the optimal cleaning cycle is current cleaning cycle;

if the $MF_j$ is equal to 2, it is indicated that meteorological elements have an influence on the photovoltaic panel in the future predetermined time, and then the cleaning time and the cleaning cycle are re-planned.

In some embodiments, after evaluating the optimal cleaning cycle and determining the optimal cleaning time based on the influence index and the standardized clean index of the photovoltaic panel, the method further includes:

acquiring meteorological forecast data in the future predetermined time;

calculating a forecast value of the cumulative amount of the photovoltaic-panel pollution environmental meteorological comprehensive index in the future predetermined time according to the meteorological forecast data; and calculating a forecast value of the standardized clean index of the photovoltaic panel in the future predetermined time according to the forecast value of the cumulative amount of the photovoltaic-panel pollution environmental meteorological comprehensive index.

The present disclosure further provides a system for evaluating cleaning demand of a photovoltaic panel based on environmental meteorological influence, including:

a module for calculating a photovoltaic-panel pollution environmental meteorological comprehensive index, configured to calculate a photovoltaic-panel pollution environmental meteorological comprehensive index based on an environmental meteorological factor, where the environmental meteorological factor includes an environmental pollution factor, a meteorological dynamic factor and a meteorological thermodynamic factor;

a module for determining a photovoltaic-panel generated power attenuation rate, configured to determine a photovoltaic-panel generated power attenuation rate based on the photovoltaic-panel pollution environmental meteorological comprehensive index;

a module for determining a maximum surplus, configured to determine a maximum surplus of a photovoltaic power station based on the photovoltaic-panel generated power attenuation rate, where a cleaning cycle corresponding to the maximum surplus is an optimal cleaning cycle;

a module for determining an optimal cumulative amount of the photovoltaic-panel pollution environmental meteorological comprehensive index, configured to determine a cumulative amount of the photovoltaic-panel pollution environmental meteorological comprehensive index in the optimal cleaning cycle as an optimal cumulative amount of the photovoltaic-panel pollution environmental meteorological comprehensive index;

a module for calculating a standardized clean index of the photovoltaic panel, configured to calculate a standardized clean index of the photovoltaic panel based on the optimal cumulative amount of the photovoltaic-panel pollution environmental meteorological comprehensive index;

a module for determining an influence index, configured to determine an influence index of meteorological elements on the photovoltaic panel in a future predetermined time; and an evaluating module, configured to evaluate the optimal cleaning cycle and determine an optimal cleaning time based on the influence index and the standardized clean index of the photovoltaic panel.

According to the specific embodiments provided by the present disclosure, the present disclosure discloses the following technical effects.

The present disclosure provides a method and a system for evaluating cleaning demand of a photovoltaic panel based on environmental meteorological influence. The method includes the following steps of: calculating a photovoltaic-panel pollution environmental meteorological comprehensive index based on an environmental meteorological factor; determining a photovoltaic-panel generated power attenuation rate based on the photovoltaic-panel pollution environmental meteorological comprehensive index; determining a maximum surplus of a photovoltaic power station based on the photovoltaic-panel generated power attenuation rate, where a cleaning cycle corresponding to the maximum surplus is an optimal cleaning cycle; determining a cumulative amount of the photovoltaic-panel pollution environmental meteorological comprehensive index in the optimal cleaning cycle as an optimal cumulative amount of the photovoltaic-panel pollution environmental meteorological comprehensive index; calculating a standardized clean index of the photovoltaic panel based on the optimal cumulative amount of the photovoltaic-panel pollution environmental meteorological comprehensive index; determining an influence index of meteorological elements on the photovoltaic panel in a future predetermined time; and evaluating the optimal cleaning cycle and determining an optimal cleaning time based on the influence index and the standardized clean index of the photovoltaic panel. The method provided by the present disclosure can scientifically and accurately formulate a photovoltaic-panel cleaning strategy of "one policy for one station" for the photovoltaic power station, optimize the cleaning cost, prolong the service life of the equipment, improve the comprehensive benefit and the operation management level of a power station, and overcome the limitations and shortcomings of manual experience determination or regular cleaning.

BRIEF DESCRIPTION OF THE DRAWINGS

In order to explain the embodiments of the present disclosure or the technical solutions in the prior art more clearly, the drawings that need to be used in the embodiments will be briefly introduced hereinafter. Apparently, the drawings in the following description are only some embodiments of the present disclosure. For those skilled in the art, other drawings can be obtained according to these drawings without creative labor.

FIG. 1 is a flowchart of a method for evaluating cleaning demand of a photovoltaic panel based on environmental meteorological influence according to the present disclosure.

FIG. 2 is a graph showing a corresponding relationship between a photovoltaic-panel pollution environmental meteorological comprehensive index PEM and a generated power attenuation rate A.

FIG. 3 is a schematic diagram of a relationship between a surplus of a photovoltaic power station per unit time, which is (power generation income-cleaning fee)/t and cleaning interval time T.

DETAILED DESCRIPTION OF THE EMBODIMENTS

Figure 4:
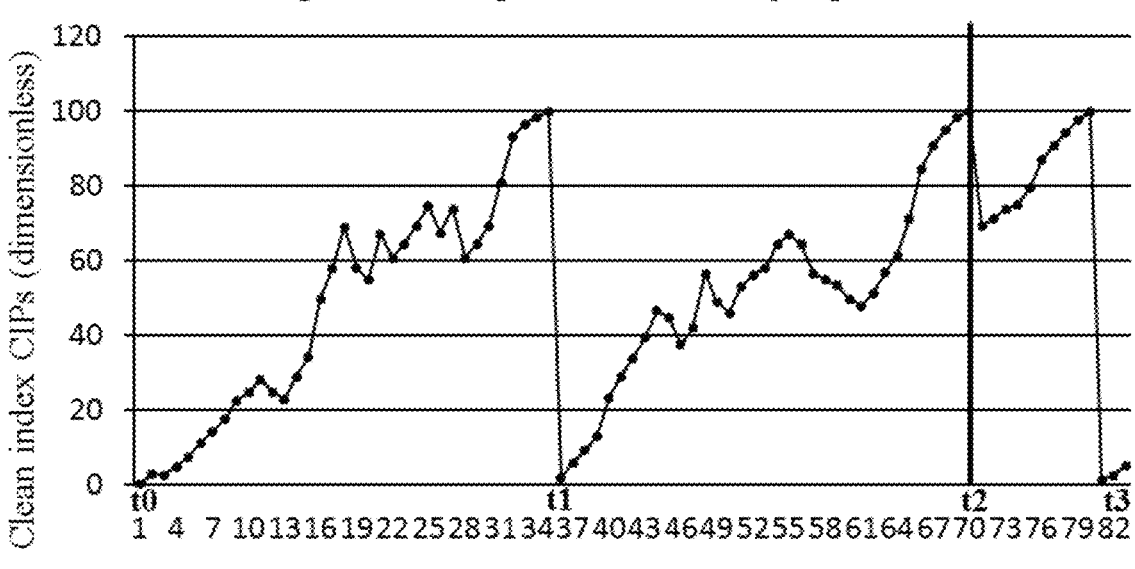
FIG. 4 is a time series diagram of a standardized clean index CIPs of the photovoltaic panel at Aksu, Xinjiang, China.

The technical solutions in the embodiments of the present disclosure will be clearly and completely described with reference to the drawings in the embodiments of the present disclosure hereinafter. Apparently, the described embodiments are only some embodiments of the present disclosure, rather than all of the embodiments. Based on the embodiment of the present disclosure, all other embodiments obtained by those skilled in the art without creative labor fall within the scope of protection of the present disclosure.

The purpose of the present disclosure is to provide a method and a system for evaluating cleaning demand of a photovoltaic panel based on environmental meteorological influence to solve the problem that the photovoltaic power station still uses a manual experience determination method or a regular cleaning method, which cannot meet the actual cleaning demand of a photovoltaic power station panel.

In order to make the above purpose, features and advantages of the present disclosure more obvious and understandable, the present disclosure will be explained in further detail with reference to the drawings and detailed description hereinafter.

Embodiment 1

As shown in FIG. 1, the method for evaluating cleaning demand of the photovoltaic panel based on environmental meteorological influence according to the present disclosure includes the following steps.

In Step 101: a photovoltaic-panel pollution environmental meteorological comprehensive index is calculated based on an environmental meteorological factor, where the environmental meteorological factor includes an environmental pollution factor (aerosol particles, etc.), a meteorological dynamic factor (a wind direction and a wind speed, sand formation and sedimentation, etc.) and a meteorological thermodynamic factor (temperature, rain, snow, ice, etc.).

In Step 102: a photovoltaic-panel generated power attenuation rate is determined based on the photovoltaic-panel pollution environmental meteorological comprehensive index.

In Step 103: a maximum surplus of a photovoltaic power station is determined based on the photovoltaic-panel generated power attenuation rate, where a cleaning cycle corresponding to the maximum surplus is an optimal cleaning cycle.

In Step 104: a cumulative amount of the photovoltaic-panel pollution environmental meteorological comprehensive index in the optimal cleaning cycle is determined as an optimal cumulative amount of the photovoltaic-panel pollution environmental meteorological comprehensive index.

In Step 105: a standardized clean index of the photovoltaic panel is calculated based on the optimal cumulative amount of the photovoltaic-panel pollution environmental meteorological comprehensive index.

In Step 106: an influence index of meteorological elements on the photovoltaic panel in a future predetermined time is determined.

In Step 107: the optimal cleaning cycle is evaluated and the optimal cleaning time is determined based on the influence index and the standardized clean index of the photovoltaic panel.

Further, Step 101 specifically includes the following steps.

A pollution index E of the environmental pollution factor on the photovoltaic panel is calculated through a formula (1):

$$E=(1-1/PM)*PM, \tag{1}$$

where PM denotes atmospheric aerosols (such as $PM_{2.5}$, $PM_{10}$, $PM_{100}$, etc.), that is, a total concentration of particulate pollutants with various particle sizes for the environmental pollution factor.

A pollution index $\gamma$ of the meteorological dynamic factor on the photovoltaic panel is calculated through a formula (2):

$$\gamma=1-\exp(-\zeta^2/2), \tag{2}$$

$$\zeta=\Sigma\zeta_i'/3, \ (i=1,2,3), \tag{3}$$

$$\zeta'=f(\tau_{zx},u^*,Ri^*), \tag{4}$$

$$\tau_{zx}=\rho U'W', \tag{5}$$

$$u^* = \frac{\chi\overline{u}}{\ln\left(\frac{z}{z_0}\right)}, \tag{6}$$

$$Ri^* \begin{cases} \begin{cases} e^{-Ri} & -0.5 < Ri \le 0 \\ e^{-Ri} & 0.5 < Ri \\ e^{-(Ri-0.5)} & 0 < Ri \le 0.5 \\ e^{Ri} & Ri < -0.5 \end{cases} \end{cases} \tag{7}$$

$$Ri = \frac{g}{\theta_e} \frac{\left(\frac{\partial \theta_e}{\partial z}\right)}{\left(\frac{\partial \bar{u}}{\partial z}\right)^2}, \tag{8}$$

Where $\zeta$ denotes a comprehensive influence parameter of atmospheric boundary layer dynamics, that is, a meteorological dynamic factor parameter; $\zeta'$ is a sensitive physical quantity in the boundary layer that influences the atmospheric wind direction and the wind speed, as well as the sedimentation of suspended particulate matter; $\tau_{zx}$ and $u^*$ denotes a turbulent vertical transport stress and a turbulent friction velocity in the boundary layer, respectively; and $Ri^*$ denotes critical values of a Wet Richardson Number for determining an atmospheric stability; U' and W' are horizontal and vertical components of the actually observed disturbance wind speed, respectively; $\rho$ is a gas density; $\chi$ is a Kalman constant of 0.4; $\bar{u}$ is an average wind speed; z is a height; and $z_0$ is a roughness; Ri is a Wet Richardson Number. When Ri reaches the critical value, it is conductive to the development of a small-scale turbulent mixing process in the boundary layer and influences the sedimentation process of suspended particulate matter in the atmosphere.

A pollution index $\beta$ of the meteorological thermodynamic factors on the photovoltaic panel is calculated through a formula (9):

$$\beta = 1 - \exp(-\theta_c), \tag{9}$$

$$\theta_e = \theta \exp\left[\left(\frac{Lw}{CpT}\right)\right], \tag{10}$$

$$\theta = T\left[\left(\frac{1000}{P}\right)^{\frac{Rd}{Cp}}\right], \tag{11}$$

Where $\theta_c$ denotes an atmospheric thermodynamic influence parameter (a wet equivalent potential temperature), that is, the meteorological thermodynamic factor parameter, $\theta$ is a potential temperature, L is a condensation latent heat of water vapors, w is a mixing ratio, Cp is a constant-pressure specific heat, Rd is a dry air gas constant, T is an air temperature, and P is an air pressure.

A photovoltaic-panel pollution environmental meteorological comprehensive index PEM is calculated through a formula (12):

$$PEM = (\gamma + \beta)^* E^* \phi, \tag{12}$$

Where the PEM has a value range of $[0,+\infty]$, and the larger the value is, the more serious the "pollution" of the photovoltaic panel is, in which the unit is dimensionless. $\phi$ is a comprehensive parameter that characterizes instrument properties, site latitude and longitude, panel installation inclination angle, and azimuth angle, etc. of the photovoltaic power station; and has a value range varying from place to place, the value range is usually 0.5-2, in which the unit is dimensionless.

Further, Step 102 specifically includes the following steps.

It is assumed that the set of the photovoltaic-panel generated power attenuation rates is A, and the set of the photovoltaic-panel pollution environmental meteorological comprehensive indexes is PEM. It is assumed that any factor in the two sets is $a \in A$, $b \in PEM$, in which a has a value range of $[0,100\%]$ and b has a value range of $[0,+\infty]$.

It is assumed that a obeys the following model:

$$a = f(b) + \varepsilon, \tag{13}$$

Where a is a generated power attenuation rate, in which the unit is dimensionless, b is a photovoltaic-panel pollution environmental meteorological comprehensive index PEM, and e is an error term, in which the unit is dimensionless.

Big data is used to estimate the model parameters to obtain $\hat{f}$, so as to obtain the estimated prediction value $\hat{a}$ of the generated power attenuation rate a:

$$\hat{a} = \hat{f}(b), \tag{14}$$

The residual $e_i$ is calculated through a formula (15):

$$e_i = a_i - \hat{a}_i, \tag{15}$$

Where $a_i$ is an i-th generated power attenuation rate, in which the unit is dimensionless; and $\hat{a}_i$ is an estimated prediction value of the i-th generated power attenuation rate $a_i$, in which the unit is dimensionless.

The coefficient of determination C is calculated through a formula (16):

$$C = 1 - \frac{\sum (a_i - \hat{a}_i)^2}{\sum (a_i - \bar{a})^2}, \tag{16}$$

Where $\bar{a}$ is a mean value of all generated power attenuation rates, in which the unit is dimensionless. The closer C is to 1, the better the evaluation and prediction of a is, in which 1 means the number 1, which is 100%. At the same time, through the embodiment, it can be seen that the relationship calculated by the big data meets the confidence level of 0.99 in the corresponding range.

Therefore, the relationship model between the photovoltaic-panel pollution environmental meteorological comprehensive index PEM and the generated power attenuation rate A is obtained.

FIG. 2 is a schematic diagram of the relationship between the photovoltaic-panel pollution environmental meteorological comprehensive index PEM and the generated power attenuation rate A. FIG. 2 is an embodiment of Aksu, Xinjiang, China from January to March in 2021. The reading local data includes: the environmental data including dustfall, PM2.5 and PM10 and other aerosol monitoring data, and the meteorological data including temperature, air pressure, humidity, wind, rain and snow, etc. The photovoltaic panel data includes the photovoltaic panel power, the installation inclination angle, the azimuth angle, the latitude and the longitude, etc. FIG. 2 shows a quantitative expression equation between the generated power attenuation rate A and the photovoltaic-panel pollution environmental meteorological comprehensive index PEM, which is represented as:

$$A = 0.0331^* \ln(PEM) - 0.0424.$$

The number of samples in this embodiment is 82. The correlation coefficient R between the photovoltaic-panel pollution environmental meteorological comprehensive index PEM and the generated power attenuation rate A reaches 0.96302, the coefficient of determination is 0.9883, and the residual mean value is −0.6334, which meets the confidence level of 0.999 within the corresponding interval.

As an important part of the theoretical method of the present disclosure, the results of this embodiment shown in FIG. 2 show that Step 101 and Step 102 in the present disclosure are reasonable and feasible in technical implementation, which provides a reliable basis for the theoretical method and implementation of the present disclosure and lays a scientific and technological foundation with high credibility.

Further, Step 103 and Step 104 specifically include the following steps.

The total cleaning cost $\Sigma C$ of the photovoltaic panel in any t time period is calculated through a formula (17):

$$\Sigma C = \text{Cost} * P_{all} * QXt, \tag{17}$$

Where Cost is a cleaning cost per unit power of the photovoltaic panel, in which the unit is yuan per kilowatt (yuan/kw); $P_{all}$ is an installed capacity of the photovoltaic power station, in which the unit is kw; and QXt is a number of cleaning times in t time period.

The total power generation income $\Sigma R$ of the photovoltaic power station in any t time period is calculated through a formula (18):

$$\Sigma R = \Sigma_{0\text{-}t}(\text{Pri} * \text{SumE} * (1-A)), \tag{18}$$

Where Pri is an on-grid electricity price of the photovoltaic power generation, in which the unit is yuan per kilowatt (yuan/kw); SumE is an amount of electricity generated when the photovoltaic panel is completely cleaned, in which the unit is kilowatt (kw); A is a generated power attenuation rate caused by "pollution" of photovoltaic panel due to meteorological environmental factors, in which the unit is dimensionless.

The surplus of the photovoltaic power station per unit time UTS (Unit Time Surplus) in any t time period is calculated through a formula (19):

$$\text{UTS} = (\Sigma R - \Sigma C)/t, \tag{19}$$

A formula of determining the threshold under the principle of maximizing power generation income in t time period is defined:

$$\text{UTS}_{max} = \text{UTS}, \tag{20}$$

$\text{UTS}_{max}$ is a maximum surplus per unit time of the photovoltaic power station in any 0-t time period. At this time, the corresponding cleaning interval cycle T is the optimal cleaning cycle, which is denoted as $T_{opt}$. At this time, the corresponding cumulative amount of the photovoltaic-panel pollution environmental meteorological comprehensive index PEM (that is, the cumulative amount in any 0-t time period) is denoted as $\Sigma \text{PEM}_{opt}$ (that is, $\text{CIP}_{opt}$, detail at [0124]).

It is well known that the cost accounting of the photovoltaic power station should be considered when formulating a cleaning strategy for the photovoltaic panel. In the present disclosure, the net-income maximization principle for cost accounting between power generation income and cleaning expenditure is designed. In order to intuitively express the meaning of formulas (17) to (20), the present disclosure provides a schematic diagram of surplus per unit time of the power generation income minus the cleaning expenditure, as shown in FIG. 3. As can be clearly seen from FIG. 3, when T is smaller (preferably smaller than $T_{opt}$), that is, the cleaning interval is shorter, the cost caused by cleaning will be higher than the additional electricity income generated by the photovoltaic panel after cleaning in comparison with to no cleaning, and at this time, $\text{UTS} < \text{UTS}_{max}$. When T is greater than $T_{opt}$, the extra loss of power of photovoltaic panel caused by more cumulative "pollution", will cause the loss of power generation income, so that $\text{UTS} < \text{UTS}_{max}$. When the cleaning interval is $T_{opt}$, the power generation surplus of $\text{UTS} = \text{UTS}_{max}$ is the maximum.

Further, Step 105 specifically includes the following steps.

The clean index of photovoltaic panel CIP is calculated through a formula (21):

$$\text{CIP}_{tn} = \Sigma \text{PEM}_i \ (i=t0\text{-}tn), \tag{21}$$

The standardized clean index CIPs of photovoltaic panel is calculated through a formula (22):

$$\text{CIPs} = (\text{CIP}_{tn} - \text{CIP}_{t0})/(\text{CIP}_{opt} - \text{CIP}_{t0}) * 100, \tag{22}$$

Where $\text{CIP}_{t0}$ is a clean index of the photovoltaic panel at time t0 (i.e., completely cleaning), $\text{CIP}_{tn}$ is a clean index of the photovoltaic panel at time tn, and $\text{CIP}_{opt}$ is a clean index of the photovoltaic panel at time when $\Sigma \text{PEM}_i = \Sigma \text{PEM}_{opt}$.

Further, Step 106 to Step 107 specifically include the following steps.

The influence index $\text{MF}_j$ is set as:

$$MF_j = F(x_{ij}) = \begin{cases} 1 & \text{without influence} \\ 2 & \text{with influence} \end{cases} \tag{23}$$

Where $x_{ij}$ denotes an influence factor type of an i-th future meteorological element in a future predetermined time, and j denotes a future predetermined time, that is, the forecast time in the near future.

The rules for objectively evaluating the optimal cleaning time and determining the cycle are as follows.

(1) When CIPs is less than 100, it denotes that the surplus of the photovoltaic power station per unit time is $\text{UTS} < \text{UTS}_{max}$, which is not the optimal cleaning time regardless of whether the environmental meteorological conditions will influence the photovoltaic panel in the near future, so there is no cleaning operation at this situation.

(2) When CIPs is equal to 100, the optimal cleaning time is reached, which indicating that the surplus of the photovoltaic power station per unit time is maximum, i.e. $\text{UTS} = \text{UTS}_{max}$.

However, at the same time, the superposition influence of environmental meteorological conditions on the photovoltaic panel in the near future should be considered additionally. Therefore, the cleaning strategy is optimized as follows.

If $\text{MF}_j$ is equal to 1, that is, the meteorological forecast in the near future has no influence on the photovoltaic panel, the photovoltaic panel cleaning should be carried out, and T at this time is the sum of timing in this time period, which is the cleaning cycle at this time.

If $\text{MF}_j$ is equal to 2, that is, the influence factors in the near future have influence on the photovoltaic panel, such influence depends on the influence factor type. For example, if the influence factor type is xi (denoting rainfall), cleaning is not implemented at first (the function of rainfall is equivalent to "free" cleaning, which saves the cost from the economic point of view). CIPs is recalculated and the cleaning time is planned according to the wet cleaning effect of rainfall on the pollution of the photovoltaic panel.

FIG. 4 is a time series diagram of standardized clean index CIPs of a photovoltaic panel at Aksu, Xinjiang, China. FIG. 4 is an embodiment of Aksu, Xinjiang, China from January to March in 2021. The reading local data includes: the environmental data including dustfall, PM2.5 and PM10 and other aerosol monitoring data, and the meteorological data including temperature, air pressure, humidity, wind, rain and snow, etc. The photovoltaic panel data includes the photovoltaic panel power, the installation inclination angle, the azimuth angle, the latitude and the longitude, etc. The time series diagram of standardized clean index CIPs of the photovoltaic panel is obtained through the calculation of formula (1) to formula (22) in the method.

The first stage of the time series characteristics of standardized clean index CIPs of the photovoltaic panel in FIG. 4 is analyzed: from January 1 to Feb. 6, 2021 (t0-t1 in the figure), CIPs increased from 0 to 100, and the time cycle was 37 days. CIPs reaches 100, and the $MF_j$ is equal to 1, which indicates that the meteorological forecast has no influence in the near future. Therefore, it is determined that the cycle of 37 days is the optimal cleaning time.

Similarly, the second stage of the time series characteristics of standardized clean index CIPs of the photovoltaic panel in FIG. 4 is analyzed: from February 7 to Mar. 12, 2021 (t1-t2 in the figure), CIPs increased to 100 after returning to 0 in the first stage of cleaning, which conforms to optimal cleaning condition. However, at this time, the $MF_j$ is equal to 2 and the influence factor type is $x_1$, which indicates that the meteorological forecast will have rainfall superposition influence in the near future. Therefore, it is determined that this time is not the optimal cleaning time, thus avoiding the loss of one cleaning cost.

The third stage of the time series characteristics of standardized clean index CIPs of the photovoltaic panel in FIG. 4 is analyzed: from March 13th to March 23rd in 2021 (t2-t3 in the figure), CIPs was influenced by rainfall from the second stage, the clean index decreased from 100 to about 70, and then increased to 100, while the influence index $MF_j$ is equal to 1, which indicates that there is no influence on the meteorological forecast in the near future. Similarly, it is determined that this time is the optimal cleaning time with a cycle of 44 days.

It can be seen from the above that the standardized clean index CIPs of the photovoltaic panel established by the present disclosure uses historical and realistic environmental and meteorological data to describe the "pollution" degree of the photovoltaic panel, which can more accurately represent the changes for a specific location at a certain time of a year and obtain more accurate cleaning decision criteria. Further, the superposition influence of environmental meteorological conditions in the near future is designed, the clean index CIPs is optimized and revised, which more effectively avoids the embarrassing situation of heavy rain (natural cleaning) just after cleaning by a manual experience determination method or a regular cleaning method, and shows the unique innovative advantages of the present disclosure.

Further, after Step 107, the following steps are further included.

The real-time online import can acquire environmental and meteorological forecast data for 1-10 days, and the forecast value of the cumulative amount of the photovoltaic-panel pollution environmental meteorological comprehensive index PEM in the next 1-10 days can be calculated, that is, the forecast value of CIP amount can be calculated. According to formula (1) to formula (22), the daily forecast value of standardized clean index CIPs of the photovoltaic panel in the next 10 days is calculated, and the predicted result of panel cleaning demand of the photovoltaic power station in the next 10 days is given. Through the predicted result, the photovoltaic power station can grasp the potential cleaning demand in the future period, so as to deploy cleaning personnel and equipment in advance.

The present disclosure has the following advantages.

The present disclosure uses the principle of parameterized diagnosis and analysis, and combines the high correlation factors of various meteorological, environmental and geographical information to construct a photovoltaic-panel pollution environmental meteorological comprehensive index PEM model for describing the influence of environmental and meteorological conditions, so as to comprehensively and quantitatively express the "pollution" change of the photovoltaic panel and make up for the defects that the previous method usually only considers dust and rainfall and the integrity of influencing factors is insufficient.

(2) On the basis of comprehensively and quantitatively describing the "pollution" degree of the photovoltaic panel by using historical and realistic environmental and meteorological data, the present disclosure further establishes a quantitative relationship between the current condition of "pollution" and the generated power attenuation, which can more accurately represent the situation of the generated power change resulted from the "pollution" of the photovoltaic panel for a specific location at a certain time of a year, and obtain more accurate cleaning decision criteria. The present disclosure is superior to the method similar to "taking measures without attention to the changes in circumstances" that only uses historical data analysis to draw conclusions and applies them to the reality.

(3) The decision-making of the present disclosure is intuitive. By creating the standardized clean index CIPs of photovoltaic panel, the current "pollution" conditions can be intuitively seen, and its standardized evaluation index with "100" as a threshold can be understood more intuitively.

(4) Compared with the previous method, the present disclosure takes into account the influence of the environmental and meteorological influence in the near future after the planned cleaning day on the cleaning interval cycle and the income-cost accounting, thus avoiding the situation of heavy rain (equivalent to free cleaning) just after cleaning by a manual experience determination method or a regular cleaning method which does not meet the optimal decision of the income-cost accounting.

(5) Compared with the previous method, the present disclosure innovatively realizes the real-time online prediction of the photovoltaic panel cleaning decision in the next 10 days based on the influence of environmental meteorological conditions, which is conductive to the deployment of cleaning personnel and equipment in the photovoltaic power station in advance.

Embodiment 2

In order to implement the method corresponding to Embodiment 1 described above, so as to realize the corresponding functions and technical effects, a system for evaluating cleaning demand of a photovoltaic panel based on environmental meteorological influence is provided hereinafter, which includes: a module for calculating a photovoltaic-panel pollution environmental meteorological comprehensive index, a module for determining a photovoltaic-panel generated power attenuation rate, a module for determining a maximum surplus, a module for determining an optimal cumulative amount of the photovoltaic-panel pollution environmental meteorological comprehensive index, a module for calculating a standardized clean index of the photovoltaic panel, a module for determining a future influence index, and an evaluating module.

A module for calculating a photovoltaic-panel pollution environmental meteorological comprehensive index, which is configured to calculate a photovoltaic panel pollution environmental meteorological comprehensive index based on an environmental meteorological factor, where the environmental meteorological factor includes an environmental pollution factor, a meteorological dynamic factor and a meteorological thermodynamic factor.

A module for determining a photovoltaic-panel generated power attenuation rate, which is configured to determine a photovoltaic-panel generated power attenuation rate based on the photovoltaic-panel pollution environmental meteorological comprehensive index.

A module for determining a maximum surplus, which is configured to determine a maximum surplus of a photovoltaic power station based on the photovoltaic-panel generated power attenuation rate, where a cleaning cycle corresponding to the maximum surplus is an optimal cleaning cycle.

A module for determining an optimal cumulative amount of the photovoltaic-panel pollution environmental meteorological comprehensive index, which is configured to determine a cumulative amount of the photovoltaic-panel pollution environmental meteorological comprehensive index in the optimal cleaning cycle as an optimal cumulative amount of the photovoltaic-panel pollution environmental meteorological comprehensive index.

A module for calculating a standardized clean index of the photovoltaic panel, which is configured to calculate a standardized clean index of the photovoltaic panel based on the optimal cumulative amount of the photovoltaic-panel pollution environmental meteorological comprehensive index.

A module for determining an influence index, which is configured to determine an influence index of meteorological elements on the photovoltaic panel in a future predetermined time.

An evaluating module, which is configured to evaluate the optimal cleaning cycle and determine an optimal cleaning time based on the influence index and the standardized clean index of the photovoltaic panel.

As used herein, the term "and/or" includes any and all combinations of one or more of the associated listed items. Further, the singular forms and the articles "a", "an" and "the" are intended to include the plural forms as well, unless expressly stated otherwise.

In this specification, various embodiments are described in a progressive way. The differences between each embodiment and other embodiments are highlighted, and the same and similar parts of various embodiments can be referred to each other.

In the present disclosure, specific examples are applied to illustrate the principle and implementation of the present disclosure, and the explanations of the above embodiments are only used to help understand the method and core ideas of the present disclosure. At the same time, according to the idea of the present disclosure, there will be some changes in the specific implementation and application scope for those skilled in the art. To sum up, the contents of the specification should not be construed as limiting the present disclosure.

What is claimed is:

1. A method for evaluating cleaning demand of a photovoltaic panel based on environmental meteorological influence, comprising:

calculating a photovoltaic-panel pollution environmental meteorological comprehensive index based on an environmental meteorological factor, wherein the environmental meteorological factor comprises an environmental pollution factor, a meteorological dynamic factor and a meteorological thermodynamic factor;

determining a photovoltaic-panel generated power attenuation rate based on the photovoltaic-panel pollution environmental meteorological comprehensive index;

determining a maximum surplus of a photovoltaic power station based on the photovoltaic-panel generated power attenuation rate, wherein a cleaning cycle corresponding to the maximum surplus is an optimal cleaning cycle;

determining a cumulative amount of the photovoltaic-panel pollution environmental meteorological comprehensive index in the optimal cleaning cycle as an optimal cumulative amount of the photovoltaic-panel pollution environmental meteorological comprehensive index;

calculating a standardized clean index of the photovoltaic panel based on the optimal cumulative amount of the photovoltaic-panel pollution environmental meteorological comprehensive index;

determining an influence index of meteorological elements on the photovoltaic panel in a future predetermined time; and evaluating the optimal cleaning cycle and determining an optimal cleaning time based on the influence index and the standardized clean index of the photovoltaic panel.

2. The method according to claim 1, wherein the calculating a photovoltaic-panel pollution environmental meteorological comprehensive index based on an environmental meteorological factor comprises:

calculating a pollution index E of the environmental pollution factor on the photovoltaic panel through a formula $E=(1-1/PM)*PM$, where PM denotes a total concentration of particulate pollutants with various particle sizes for the environmental pollution factor;

calculating a pollution index $\gamma$ of the meteorological dynamic factor on the photovoltaic panel through a formula $\gamma=1-\exp(-\zeta^2/2)$, where $\zeta$ denotes a meteorological dynamic factor parameter;

calculating a pollution index $\beta$ of the meteorological thermodynamic factor on the photovoltaic panel through a formula $\beta=1-\exp(-\theta_e)$, where $\theta_e$ denotes a meteorological thermodynamic factor parameter; and calculating a photovoltaic-panel pollution environmental meteorological comprehensive index PEM through a formula $PEM=(\gamma+P)*E*\phi$, where $\phi$ denotes a comprehensive parameter of the photovoltaic panel.

3. The method according to claim 1, wherein the determining a photovoltaic-panel generated power attenuation rate based on the photovoltaic-panel pollution environmental meteorological comprehensive index comprises:

determining a relationship model between the photovoltaic-panel pollution environmental meteorological comprehensive index and the photovoltaic-panel generated power attenuation rate using a big data machine learning algorithm; and substituting the photovoltaic-panel pollution environmental meteorological comprehensive index into the relationship model to obtain the photovoltaic-panel generated power attenuation rate.

4. The method according to claim 1, wherein the determining a maximum surplus of a photovoltaic power station based on the photovoltaic-panel generated power attenuation rate comprises:

calculating a total cleaning cost of the photovoltaic panel;

calculating a total power generation income of the photovoltaic power station based on the photovoltaic-panel generated power attenuation rate; and calculating the maximum surplus of the photovoltaic power station based on the total cleaning cost of the photovoltaic panel and the total power generation income of the photovoltaic power station.

5. The method according to claim 1, wherein the calculating a standardized clean index of the photovoltaic panel based on the optimal cumulative amount of the photovoltaic-panel pollution environmental meteorological comprehensive index comprises:

calculating a standardized clean index CIPs of the photovoltaic panel through a formula $\mathrm{CIPs}=(\mathrm{CIP}_{tn}-\mathrm{CIP}_{t0})/(\mathrm{CIP}_{opt}-\mathrm{CIP}_{t0})*100$, where $\mathrm{CIP}_{t0}$ is a clean index of the photovoltaic panel at a time t0, $\mathrm{CIP}_{tn}$ is a clean index of the photovoltaic panel at a time tn, and $\mathrm{CIP}_{opt}$ is a clean index of the photovoltaic panel corresponding to the optimal cumulative amount of the photovoltaic-panel pollution environmental meteorological comprehensive index.

6. The method according to claim 1, wherein a formula of the influence index of meteorological elements on the photovoltaic panel in the future predetermined time is represented as follows:

$$MF_j = F(x_{ij}) = \begin{cases} 1 & \text{without influence} \\ 2 & \text{with influence} \end{cases}$$

where $MF_j$ denotes an influence index of future meteorological elements on the photovoltaic panel, F(.) denotes a function about an influence factor, $x_{ij}$ denotes an influence factor of an i-th future meteorological element in the future predetermined time, and j denotes a future predetermined time.

7. The method according to claim 1, wherein the evaluating the optimal cleaning cycle and determining an optimal cleaning time based on the influence index and the standardized clean index of the photovoltaic panel comprises:

when the standardized clean index of the photovoltaic panel is less than 100, no cleaning is performed;

when the standardized clean index of the photovoltaic panel is equal to 100, assuming that a current time is the optimal cleaning time and considering the influence index, a cleaning strategy is as follows:

if the influence index is equal to 1, it is indicated that meteorological elements have no influence on the photovoltaic panel in the future predetermined time, and the optimal cleaning cycle is current cleaning cycle;

if the influence index is equal to 2, it is indicated that meteorological elements have an influence on the photovoltaic panel in the future predetermined time, and the cleaning time and the cleaning cycle are re-planned.

8. The method according to claim 1, wherein after evaluating the optimal cleaning cycle and determining the optimal cleaning time based on the influence index and the standardized clean index of the photovoltaic panel, the method further comprises:

acquiring meteorological forecast data in the future predetermined time;

calculating a forecast value of the cumulative amount of the photovoltaic-panel pollution environmental meteorological comprehensive index in the future predetermined time according to the meteorological forecast data; and calculating a forecast value of the standardized clean index of the photovoltaic panel in the future predetermined time according to the forecast value of the cumulative amount of the photovoltaic-panel pollution environmental meteorological comprehensive index.

9. A system for evaluating cleaning demand of a photovoltaic panel based on environmental meteorological influence, comprising:

a module for calculating a photovoltaic-panel pollution environmental meteorological comprehensive index, configured to calculate a photovoltaic-panel pollution environmental meteorological comprehensive index based on an environmental meteorological factor, wherein the environmental meteorological factor comprises an environmental pollution factor, a meteorological dynamic factor and a meteorological thermodynamic factor;

a module for determining a photovoltaic-panel generated power attenuation rate, configured to determine a photovoltaic-panel generated power attenuation rate based on the photovoltaic-panel pollution environmental meteorological comprehensive index;

a module for determining a maximum surplus, configured to determine a maximum surplus of a photovoltaic power station based on the photovoltaic-panel generated power attenuation rate, wherein a cleaning cycle corresponding to the maximum surplus is an optimal cleaning cycle;

a module for determining an optimal cumulative amount of the photovoltaic-panel pollution environmental meteorological comprehensive index, configured to determine a cumulative amount of the photovoltaic-panel pollution environmental meteorological comprehensive index in the optimal cleaning cycle as an optimal cumulative amount of the photovoltaic-panel pollution environmental meteorological comprehensive index;

a module for calculating a standardized clean index of the photovoltaic panel, configured to calculate a standardized clean index of the photovoltaic panel based on the optimal cumulative amount of the photovoltaic-panel pollution environmental meteorological comprehensive index;

a module for determining an influence index, configured to determine an influence index of meteorological elements on the photovoltaic panel in a future predetermined time; and an evaluating module, configured to evaluate the optimal cleaning cycle and determine an optimal cleaning time based on the influence index and the standardized clean index of the photovoltaic panel.

* * * * *